(12) United States Patent
Braiman (10) Patent No.: US 9,097,787 B2
(45) Date of Patent: Aug. 4, 2015

(54) LOCATION METHOD AND SYSTEM USING COLLIDING SIGNALS

(75) Inventor: Michael Braiman, Netanya (IL)

(73) Assignee: PRECYSE TECHNOLOGIES, INC., Atlanta, GA (US)

( * ) Notice: Subject to any disclaimer, the term of this patent is extended or adjusted under 35 U.S.C. 154(b) by 1013 days.

(21) Appl. No.: 12/943,990

(22) Filed: Nov. 11, 2010

(65) Prior Publication Data

US 2011/0159888 A1  Jun. 30, 2011

Related U.S. Application Data

(60) Provisional application No. 61/260,524, filed on Nov. 12, 2009.

(51) Int. Cl.
*G01S 5/02* (2010.01)
(52) U.S. Cl.
CPC ............. *G01S 5/0278* (2013.01); *G01S 5/0252* (2013.01)
(58) Field of Classification Search
USPC ................ 342/451, 458, 385–387, 463–465; 455/456.1, 278.1
See application file for complete search history.

(56) References Cited

U.S. PATENT DOCUMENTS

| | | | |
|---|---|---|---|
| 8,031,120 B2 * | 10/2011 | Smith et al. ................... | 342/451 |
| 2005/0030229 A1 * | 2/2005 | Spilker, Jr. ................... | 342/385 |
| 2005/0243790 A1 * | 11/2005 | Mesecher et al. ............. | 370/342 |
| 2008/0315999 A1 | 12/2008 | Braiman | |
| 2009/0267823 A1 | 10/2009 | Konishi | |

FOREIGN PATENT DOCUMENTS

WO    WO03098528 A2    11/2003

OTHER PUBLICATIONS

Corresponding International Application No. PCT/IB2010/003046 International Search Report and Written Opinion dated Apr. 18, 2011.

* cited by examiner

*Primary Examiner* — Dao Phan
(74) *Attorney, Agent, or Firm* — Duane Morris LLP; Steven E. Koffs (57) ABSTRACT

A method comprises: receiving colliding signals by a receiver from a plurality of signal sources, such that the receiver has a respective non-zero probability of detecting and identifying the colliding signals from each respective one of the signal sources at a given time. The colliding signals are configured with at least one common transmission parameter value so as to interfere with each other, so that the receiver only detects and identifies one of the received colliding signals at any given time. The receiving and identifying are performed during each of a plurality of cycles. A probabilistic model is used to calculate the location of the receiver. The model correlates a respective number of times the receiver detects and identifies one of the colliding signals and the probability of that signal being identified by the receiver, given the location of the receiver.

26 Claims, 9 Drawing Sheets

LOCATION METHOD AND SYSTEM USING COLLIDING SIGNALS

This application claims the benefit of U.S. Provisional Patent Application No. 61/260,524, filed Nov. 12, 2009, which is expressly incorporated by reference herein in its entirety.

FIELD

The present disclosure relates to location and tracking systems.

BACKGROUND

Typical methods and technologies widely used for locating objects in three dimensional space are based on triangulation utilizing various received signal parameters. For example, typical radio frequency identification (RFID)/Real-Time Location System (RTLS) tags periodically transmit RF signals that are then received by geographically distributed RF readers. The final tag location is calculated using one of the following parameters or their combinations: received signal strength, phase delay, angle of a signal arrival and etc.

GPS receivers calculate their location using the above mentioned parameters of the received signal transmitted by the GPS satellites, surrounding the Earth.

These methods usually require a complicated digital signal processing to be involved in the calculation, increasing the cost of the devices and the system.

An improved location method and system are desired.

SUMMARY

In some embodiments, a method comprises: receiving colliding signals by a receiver from a plurality of signal sources, such that the receiver has a respective non-zero probability of detecting and identifying the colliding signals from each respective one of the signal sources at a given time. The colliding signals are configured with at least one common transmission parameter value so as to interfere with each other, so that the receiver only detects and identifies one of the received colliding signals at any given time. The receiving and identifying are performed during each of a plurality of cycles. A probabilistic model is used to calculate the location of the receiver. The model correlates a respective number of times the receiver detects and identifies one of the colliding signals and the probability of that signal being identified by the receiver, given the location of the receiver.

In some embodiments, a machine readable storage medium is encoded with computer program code, such that when the computer program code is executed by a processor associated with a receiver, the processor performs a method comprising: receiving colliding signals by a receiver from a plurality of signal sources, such that the receiver has a respective non-zero probability of detecting and identifying the colliding signals from each respective one of the signal sources at a given time. The colliding signals are configured with at least one common transmission parameter value so as to interfere with each other, so that the receiver only detects and identifies one of the received colliding signals (the one having larger probability to be detected and read) at any given time. The receiving and identifying are performed during each of a plurality of cycles. A probabilistic model is used to calculate the location of the receiver. The model correlates a respective number of times the receiver detects and identifies one of the colliding signals and the probability of that signal being identified by the receiver, given the location of the receiver.

In some embodiments, an apparatus comprises a receiver for receiving colliding signals from a plurality of signal sources, such that the receiver has a respective non-zero probability of detecting and identifying the colliding signals from each respective one of the signal sources at a given time. The colliding signals are configured to interfere with each other, so that the receiver only detects and identifies one of the received colliding signals with the larger probability to be detected and read at any given time. The receiving and identifying are performed during each of a plurality of cycles. A processor is configured to use a probabilistic model to calculate the location of the receiver, wherein the model correlates a respective number of times the receiver detects and identifies one of the colliding signals and the probability of that signal being identified by the receiver, given the location of the receiver.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning coupling and the like, such as "connected" and "interconnected," unless expressly described otherwise, refer to a relationship wherein devices are in signal communication either via wired, wireless, optical or magnetic link, where such link may either be direct or by way of intervening nodes and structures.

As used herein, the term "colliding signals" refers to two or more signals, transmitted at the same time in the same area, having the following characteristics:

1. Signals are specifically configured to interfere with each other.

2. The basic transmitting signal parameters are drifting randomly, causing variation in the maximum likelihood of the receiving signal during detection. The random drifting function of the transmitting signal parameters is known (for inst. Gaussian with the mean=0 and variance $\sigma^2$).

2. Each signal has 100% probability to be detected and read by the receiver if transmitted alone and non-zero probability to be detected and read when colliding with the other signals transmitted by the colliding sources. As used herein, "detecting" the signals includes determining the existence of signal emissions (e.g., RF emissions). As used herein, "Reading" the signals includes extracting one or more payload data from the signals. As used herein, "Identifying signals" includes extracting information unique to signals from one signal source.

In alternative embodiments, one or more other payload parameter may be varied in addition to the compression code. Nevertheless, the signals interfere so that the receiver can read just one of the colliding signals and identify one of the signal sources, if multiple signals are received.

The Receiver

The receiver is the device that is capable to receive, detect and successfully read one of colliding signals at the given moment.

Figure 1:
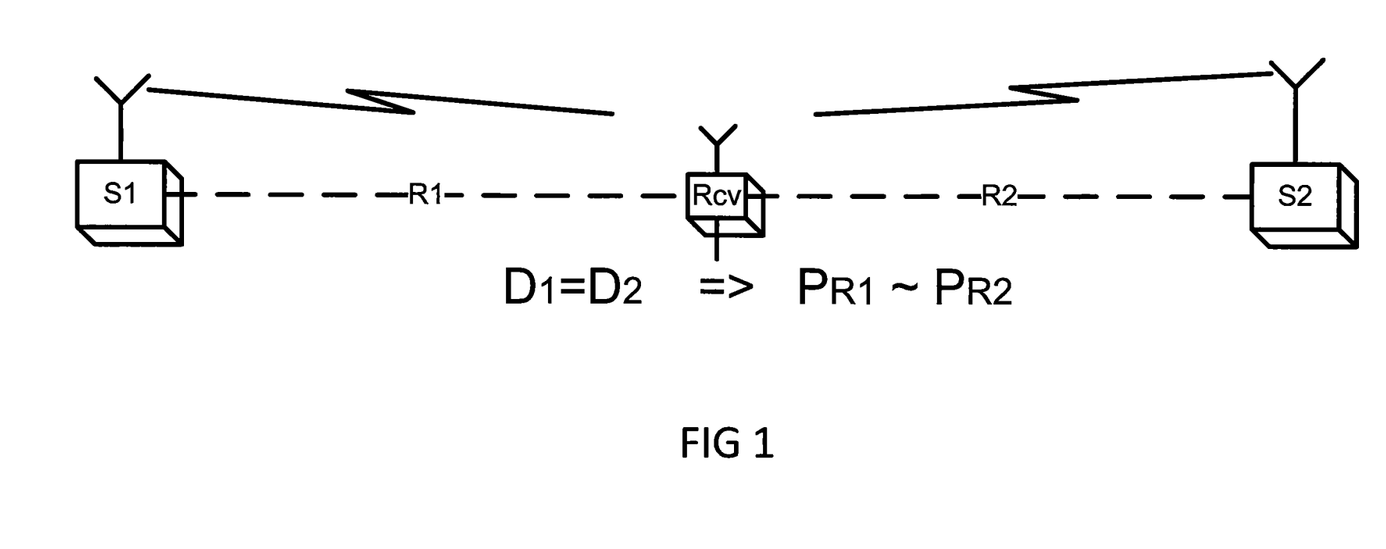
FIG. 1 is a diagram of a system having a receiver centered between two equidistant signal sources.

One example of an algorithm for performing tag location in a colliding signal environment is based on the following assumptions:

Reference is made to FIG. 1, which show two signal sources S1 and S2, with a receiver Rcv positioned midway between the two signal sources. Assume two colliding signals transmitted by the independent sources S1, S2 exist in the area where the receiver is located. The transmitting signal pattern is:

$S_1(t) = Re\{[A_0 \cdot g_1(t) + a(t)] \cdot e^{j\omega t}\}$ and $S_2(t) = Re\{[A_0 \cdot g_2(t) + a(t)] \cdot e^{j\omega t}\}$ and $R_1(t) = Re\{k \cdot [A_0 \cdot g_1(t) + a(t)] \cdot e^{j\omega t}\}$ and $R_2(t) = Re\{k \cdot [A_0 \cdot g_2(t) + a(t)] \cdot e^{j\omega t}\}$ Where $A_0$—the amplitude of the transmitting signal $g_1(t)$ and $g_2(t)$—payloads of the transmitting signals $S_1$ and $S_2$ respectively $R_1(t)$ and $R_2(t)$—received signal patterns corresponding to $S_1$ and $S_2$ $a(t)$—a drift in the signal parameters having let say normal Gaussian distribution with the mean=0 and variance $\sigma^2$ $\omega$—central frequency $t$—time $k$—signal propagation coefficient, representing a signal change due to its propagation on the path from the transmitter to the receiver. k is a constant for a specific environment the signal is propagating through.

The authenticity P(R,S) of the received signal R is then defined and calculated as:

$$P(R, S) = \frac{1}{\sqrt{2 \cdot \pi} \cdot \sigma_0} \cdot e^{-(R-S)^2/2 \cdot \sigma_0^2}$$

According to the above definition of the authenticity, there is a linear relation between authenticity and probability of detection. Thus, as authenticity increases, the probability of detection increases.

Figure 2:
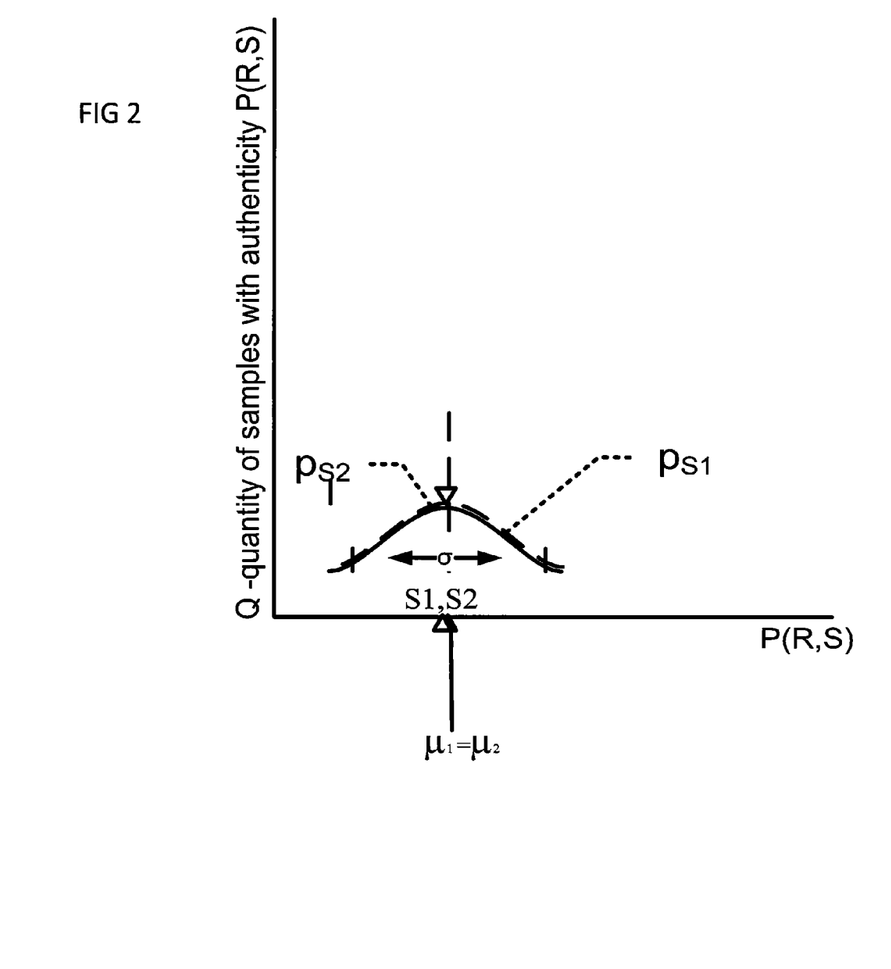
FIG. 2 is a diagram showing probability distribution functions for detection and identification of signals from each of the two sources shown in FIG. 1.

FIG. 2 shows the probability density functions P(R1) and P(R2) for the received signal authenticity of each of the signals from S1 and S2. Assume that the receiver is equidistant on the line between two competing signal sources, thus $D_1=D_2$ and its geographical position is stable. Then the received signal authenticity can be determined by the normal Gaussian distribution function with mean $\mu_1=\mu_2=p(R,S)$ and a standard deviation $\sigma$ As shown in FIG. 2, at any given time, each of the received signals R1 and R2 can have an authenticity for either of the two signal sources that is the greater of the two during a given instance (or cycle). In any particular instance (or cycle), whichever of the two received signals has the greater authenticity is read and that signal source is identified during that cycle. Then, it is clear that considering the normal Gaussian distribution function of the received signal authenticity P(R, S) with the equal mean $\mu_1=\mu_2$ values for received signals R1 and R2 relatively, as time approaches $\infty$ the p(S) probability of the receiver to successfully detect and read one of two colliding signals approaches 50%.

From the other hand the probability of the signal detection, p(S) value can be easily measured and calculated empirically by registering all identified signal sources within the period of time t and using the following equitation:

$$p(S_1) = \frac{n(R_1)}{n(R_1) + n(R_2)} \text{ for the received signal } R1$$

and $$p(S_2) = \frac{n(R_2)}{n(R_1) + n(R_2)} \text{ for the received signal } R2$$

Or for multiple signal sources $$p(S_2) = \frac{n(R_m)}{n(R_1) + n(R_2) + \ldots + n(R_k)}$$

Where n—the number of detections for signal m within k signal sources

Figures 3, 4:
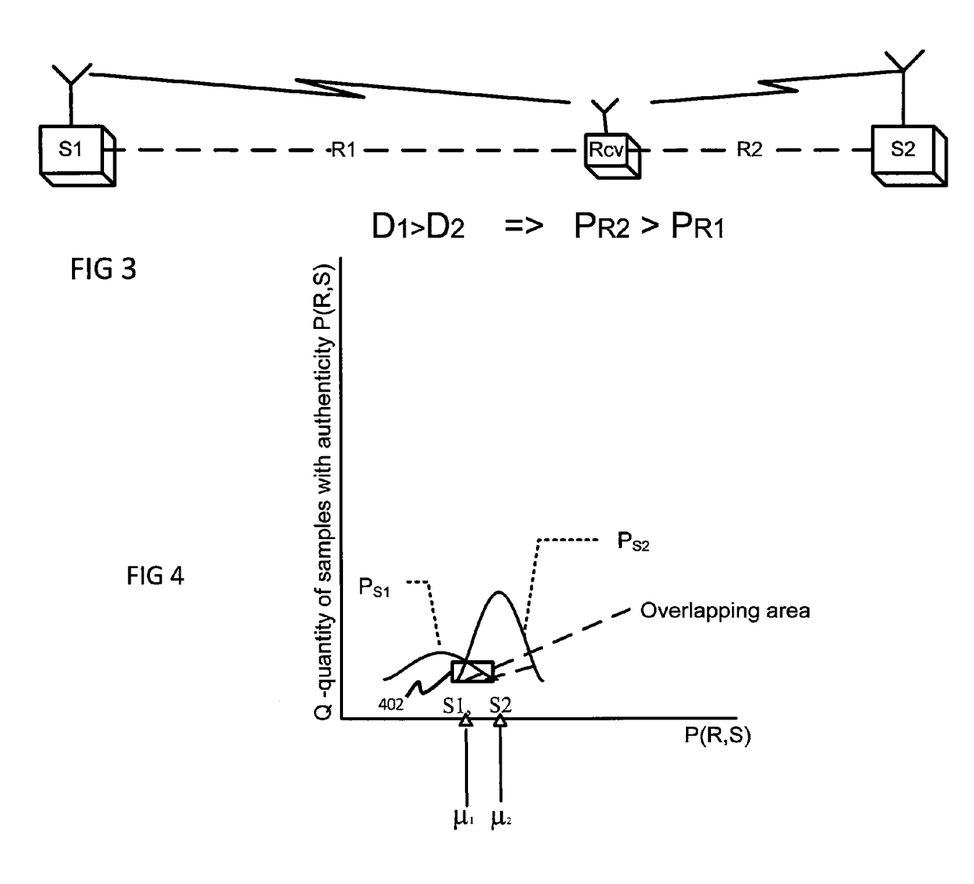
FIG. 3 is a diagram of a system having a receiver between two unequally spaced signal sources.
FIG. 4 is a diagram showing probability distribution functions for detection and identification of signals from each of the two sources shown in FIG. 3.

FIG. 3 shows the same two signal sources S1 and S2, and the same receiver Rcv, as shown in FIG. 1. In FIG. 3, the receiver Rcv is located closer to the signal source S2 than to signal source S1. Because the signal strength is reduced when the distance from the signal source increases, the amplitude of the received signal from source S2 has a greater mean than the mean amplitude of the received signal from source S1, thus the corresponding mean $\mu_2$ of authenticity of the received signal R2 will be greater than $\mu_1$—the authenticity of the received signal R1. So, the p(S2)—probability of the signal detection, will be greater than p(S1). Thus, there is a direct correlation between the overall probability of the colliding signal to be detected and its actual 3D position between colliding sources. Referring now to FIG. 4, the authenticity of the received signal R2 at the location of receiver Rcv now has a greater mean $\mu_2$ than the mean $\mu_1$ of the received signal R1. Nevertheless, the means $\mu_1$ and $\mu_2$ are within three standard deviations of each other, so that the received signal authenticity from each source has a non-zero probability of falling within the range from $\mu_1$ to $\mu_2$. In other words, because of the random variation in received signal authenticity of each of the signals, in any given individual transmission cycle, there is a probability that the authenticity of the received signal R1 will be greater than this of R2, so R1 will be detected although its mean $\mu_1$ is lower than this of R2. The probability of this event, however will be lower than the probability of R1 detection.

Thus, the single dimensional position $R_x$ of the receiver device residing on the line in and between independent colliding signal sources, correlates to the probability ratio between two probability of success values representing the corresponding probability of the first and the second signals to be detected by the receiver:

$$R_x = q\left[\frac{p(R_1)}{p(R_2)}\right] \quad (1)$$

Where:

q—is a coefficient connecting the probability ratio and the actual distance.

Equation (1) is true when both sources transmit at the same amplitude level. In case two colliding sources transmit on a different amplitude levels, hence amplitudes of the transmitting signals will not be equal $$A_{tr_1} \neq A_{tr_2}$$

In that case, $P(R_1) \neq P(R_2)$ even when receiver is equidistant on the line between two transmitting sources. Thus amplitude value $A_{tr}$ of each colliding source must to be included in the final position calculation:

$$R_x = q\left[\frac{w_1 P(S_1)}{w_2 P(S_2)}\right] \quad (2)$$

Where:

$w_n$—is a transmitted amplitude weighted factor:

$$w_n \sim \frac{1}{A_{tr_n}}$$

In some embodiments, the algorithm for locating a receiver device residing in the area covered by a plurality of geographically distributed colliding signal sources is based on formula (2).

Figure 5:
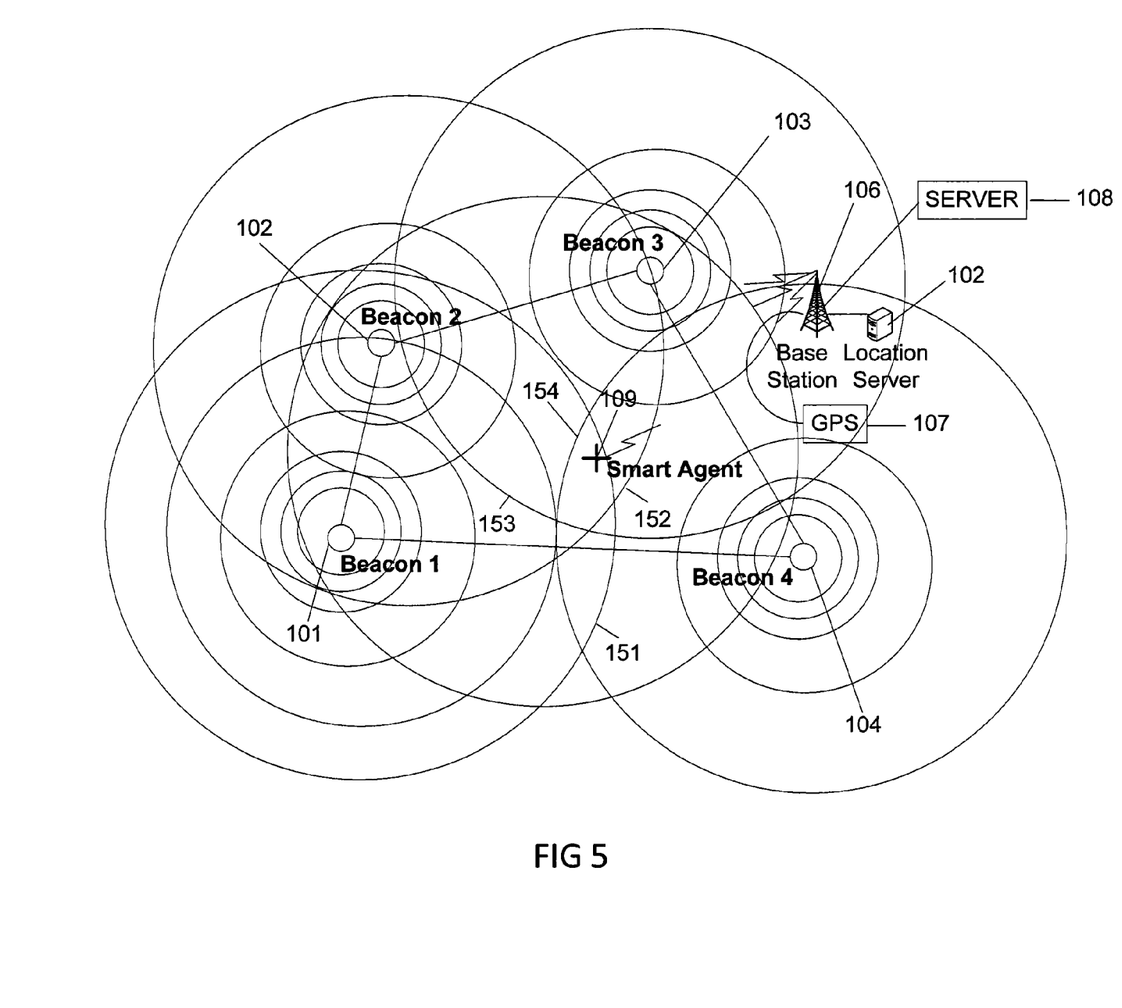
FIG. 5 is a schematic diagram showing a location system having a plurality of colliding signal sources.

FIG. 5 is a schematic diagram of a system having a plurality of colliding signal sources, such as RF beacons 101-104, located sufficiently close within a geographic region to produce colliding signals at the location of a receiver 109, which may be a smart agent or RF tag, for example. Assume that a number of colliding sources 101-104 is n.

The three dimensional geographical position of the receiver is in the "center of mass" of the three dimensional shape formed by the lines between the transmitting nodes, where the "mass" of each node will be defined as a total number of times the receiver has detected the signal transmitted by the specific node weighted by its transmitted power. The formula for calculating the "mass" of the specific node and its Emitted Isotropic Radiated Power (EIRP) weighted factor may vary.

The X,Y,Z coordinates of the receiver location can be calculated as described below:

$$X = \frac{\sum_{i=0}^{n}\left[\frac{Q_i^2 x_i}{r_i}\right]}{\sum_{i=0}^{n}\left[\frac{Q_i^2}{r_i}\right]}, \quad (3)$$

$$Y = \frac{\sum_{i=0}^{n}\left[\frac{Q_i^2 y_i}{r_i}\right]}{\sum_{i=0}^{n}\left[\frac{Q_i^2}{r_i}\right]},$$

$$Z = \frac{\sum_{i=0}^{n}\left[\frac{Q_i^2 z_i}{r_i}\right]}{\sum_{i=0}^{n}\left[\frac{Q_i^2}{r_i}\right]}$$

Where:

$x_n$, $y_n$, $z_n$—coordinates of the $n^{th}$ colliding source (in meters)

$Q_n$—a number of a particular colliding signal successful detections $r_n$—maximum range of the an antenna coverage, calculated as a function of the transmitted EIRP (Emitted Isotropic Radiated Power) and a receiver sensitivity level.

Figure 8:
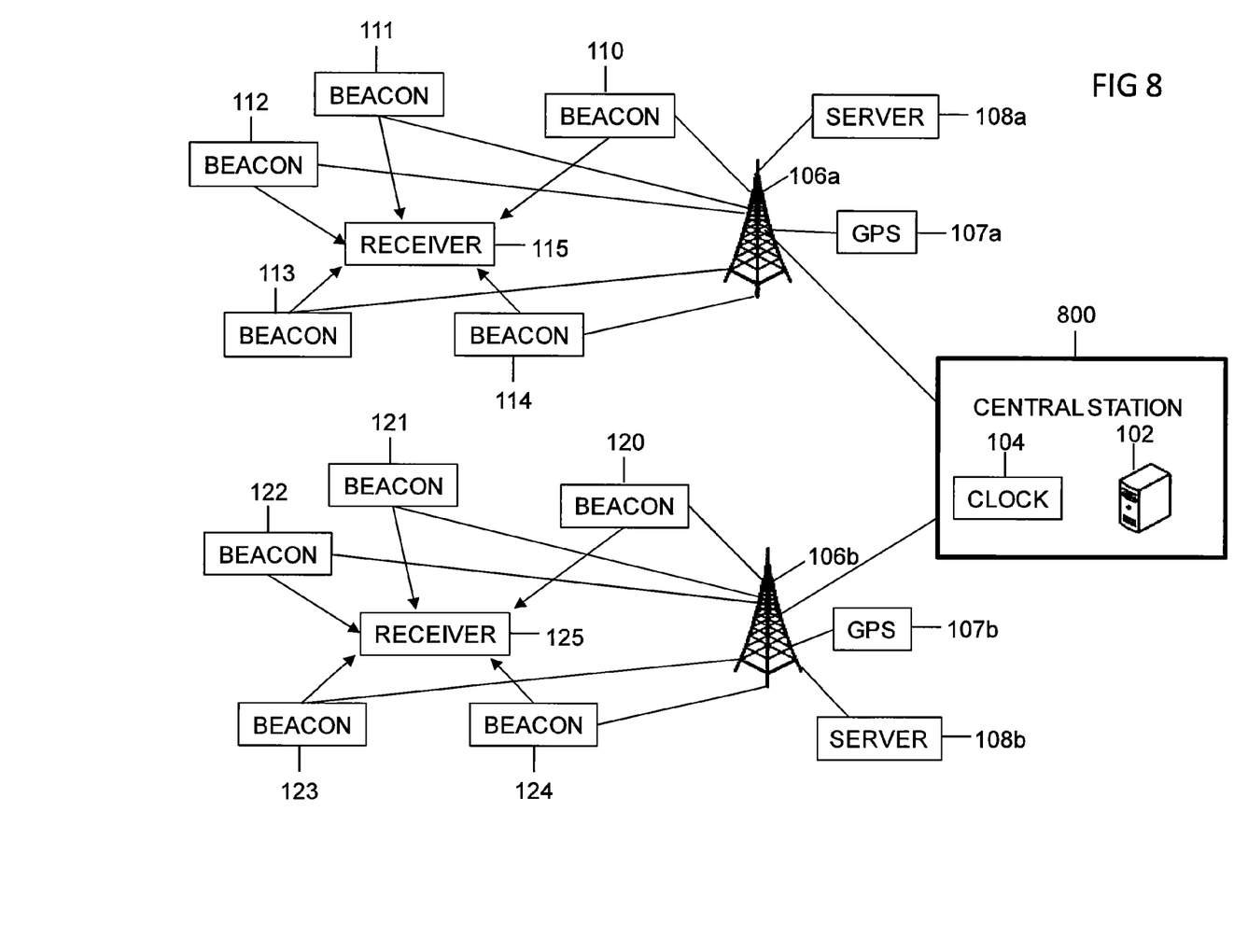
FIG. 8 is a block diagram of a location system having plural base stations coupled to a central station.

In some embodiments, a programmed computer processor at a central station performs the above calculations to determine the position of a plurality of devices in various geographic locations. In other embodiments a base station server associated with a plurality of beacons 101-104 in a given geographic area may perform the algorithm for each device in the area served by those beacons. A plurality of such base stations may be provided at respective locations (as shown in FIG. 8).

The proposed system comprises the following components (ref. FIG. 5). Hardware components of the system may include beacons 101-104, an RF Base Station 106 and a plurality of smart agents 109, of types described in U.S. Patent Application Publication No. US2008/0315999A1, published Dec. 25, 2008, which is incorporated by reference herein in its entirety:

Beacons—In some embodiments, the beacons 101-104 are RF devices that periodically transmit colliding signals from a plurality of sources. In other embodiments, the beacons are other types of energy sources that periodically commit colliding signals, including electrical, magnetic, optical or sound signals.

In some embodiments, some or all of the beacons 101-104 are comprised of 2 or more independent transmitting sources. The more independent colliding sources are included in the transmission the better the location estimation will be.

The system includes at least one RF beacon 101 used for locating smart agents 109 within a predefined area and for initiating data exchange with smart agents. In some embodiments, the smart agents are otherwise usually in a sleep mode for minimizing power consumption of the smart agent battery, when the smart agents are not exchanging data with the beacons 101-104.

In some embodiments, each beacon device 101-104 may have one, two, three, or four or more independent beaconing sources with respectively different frequencies. So one of the beacon assemblies may include plural (e.g. four) devices in one beacon. For example, a beacon model No. BC24/403000 from Precyse Technologies, Inc. of Rosh Haayn, Ill. In some embodiments, each beacon 101-104 in the system has the same number of signal sources, with the same combination of frequencies. In other embodiments, various beacon assemblies 101-104 are provided having different numbers of signal sources in different beacons. Preferably, for each frequency used, the various beacons collectively include at least a predetermined number (e.g., five) of signal sources operating at that frequency near any given location of interest.

In some embodiments, the RF beacons 101-104 operate within a defined range of the system area, to transmit wakeup calls via an RF link to an agent 109 which may be in a sleep mode. The RF beacon may also transmit to a central processor the associated coverage area which is included within the tracking area of the system.

RF base station—the RF transceiver. In some embodiments, the RF transceivers of base station units 106 is used to synchronize both the beacons 101-104 and the receiving device 109 to the system clock 104, as well as receive the final data sent by the receiver 109 for further processing by central processor 102 (in case processing is not done locally in the receiver 109).

RF transceivers of base station units 106 provide the communication link between smart agents 109 and the central processor 102. Each base station unit is connected to a data communication module comprising client and server units. Each base station unit 106 may further be connected to a GPS receiver 107 providing base station location data to the central unit. Data communication modules connected to the associated base station units may communicate with a mediation control server via data communication unit.

Central Station

Figure 9:
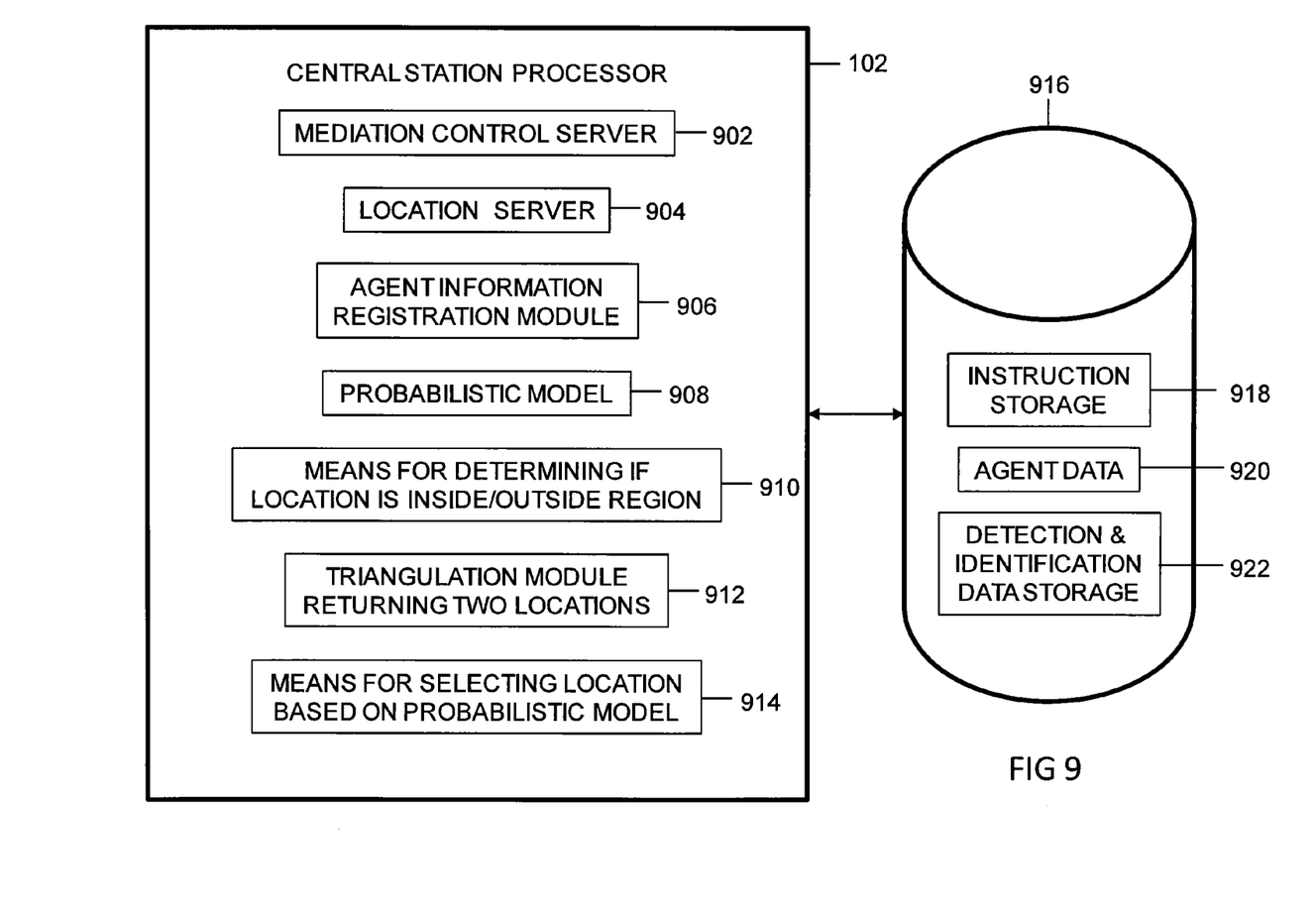
FIG. 9 is a diagram of the central station processor of FIG. 8.

FIGS. 8 and 9 show an embodiment having a plurality of base stations 106a, 106b coupled to a central station processor 102 at a central station 800. Each base station 106a, 106b has a respective GPS receiver 107a, 107b and a respective server 108a, 108b. Base station 106a, communicates with a first plurality of beacons 110-114 in a first region, and base station 106b, communicates with a second plurality of beacons 120-124 in a second region. The first receiver 115 receives colliding signals from beacons 110-114, and the second receiver 115 receives colliding signals from beacons 120-125.

The central station processor 102 is shown in greater detail in FIG. 9. The processor 102 has at least one mass storage device 916, for storing instructions 918 and data used and generated by the applications. The Mediation control server 902 within the processor of the central unit 102, carries out the system operation algorithm and the user application interface. The mediation control server 902 receives location data 922 (including the detection and identification data) from a location server 904 and stores all the pertinent data concerning the agents in a database 920 defined as agent information registration module 906. The processor 902 may also execute several of the processes described herein, including the probabilistic model 908 for receiver location, a means 910 for determining whether a receiver location is inside or outside of a region, a triangulation module 912 (means for performing triangulation returning up to two locations), and a means 914 for selecting the location based on the probabilistic model.

In the embodiment of FIGS. 8 and 9, since RF smart agents 115, 125 are being used, agent location may be determined by the RF triangulation module 912 using an RF triangulation method utilizing the intersection of two lines of radio frequency signals reflected from the agent, to measure agent location.

Data associated with agent location, obtained by RF triangulation, is calculated by the location server 904 to provide the location of every smart agent 115, 125. As one of ordinary skill in the art understands, conventional triangulation can provide ambiguous results, because a signal outside of an area may be reflected from a surface inside the area, and the reflected signal may be detected and used for triangulation. Thus, if a receiver 115 is outside of the region bounded by the beacons, triangulation module 909 may identify two possible locations of each receiver, one inside the region, the other outside the region. In some embodiments, the colliding signals detection method described herein may be used in combination with triangulation, to reduce or eliminate this ambiguity. A process for implementing both of these functions may be implemented in a programmed computer 102 in the central station, or in the base station server. For example, by initially performing the colliding signals algorithm described above using the probabilistic model 908, the programmed processor determines whether a given smart agent is inside or outside of the area enclosed by the beacons. Then, triangulation module 909 can use triangulation to determine the location of the smart agent 115, (which may be inside or outside of the area enclosed by the beacons 110-114). Use of the colliding signals method allows identification of which of the two possible triangulation results is correct.

The synchronous operational mode of the system facilitates sharing effectively limited resources, such as the central unit 102 processing power by a plurality of clients such as smart agents 115, 125. A single clock generator 104, broadcasted over the communication link and available to all the system modules, facilitates a synchronous operation of the system. The clock signal may be obtained from one of the system units or be entirely independent clock generator 104. Using synchronous communication reduces the probability of error rate and reduces the length of exchanged messages by staying away from frequently having to resend a message in less reliable asynchronous communication systems. The synchronous operating mode also facilitates the signal collision at each frequency.

A user can operate the system via a user application program connected to the mediation control server via an Application Program Interface (API). Furthermore, the communication protocol is also synchronized to the system clock and operable by the user through a terminal.

Smart Agent—the transceiver used to detect and read colliding signals and process them. Smart Agent transmits the received signal parameters to the server via Base Station for further processing (if required) for determining location and identification of the smart agent, and the corresponding asset with which it is associated. An asset is an object that can be tracked by affixing a smart agent to it. For example, in a manufacturing or warehousing facility, assets may include tools and/or components that are tracked. The smart agent is affixed to its corresponding asset. A variety of attachment techniques may be used. The smart agent is capable of scanning all the frequencies that are used by the beacon signal sources in the system, to provide more statistical location data, so that the triangulation result is more stable.

In some embodiments, location and identification processing is performed in a programmed processor at the base station (106a or 107a) or a central server 102, to reduce smart agent battery power consumption.

Figure 10:
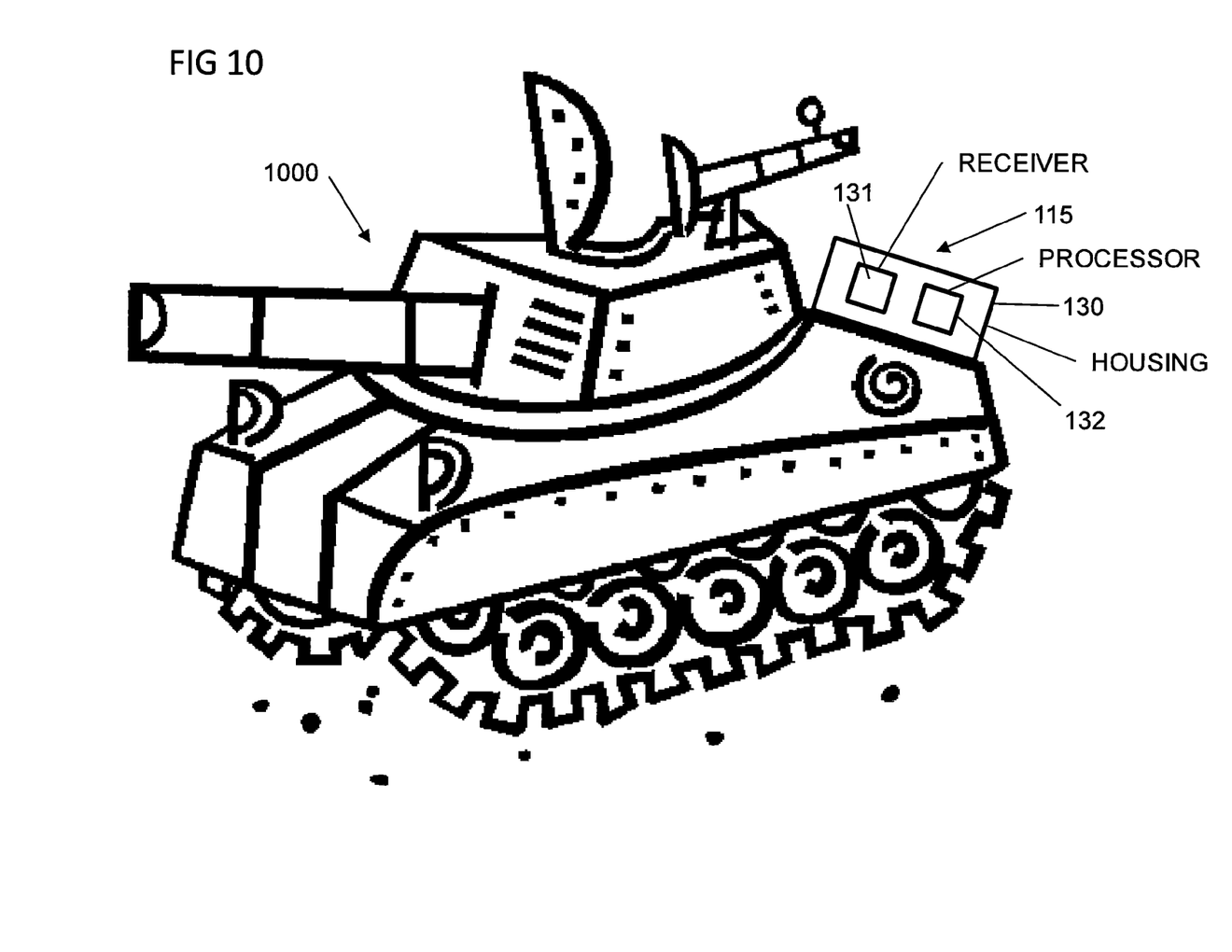
FIG. 10 shows an asset having an attached smart tag containing the receiver of FIG. 5 or 8.

In other embodiments, the smart agents 115, 125 many include a digital signal processor (DSP) for performing location processing. The processor then calculates the X, Y and Z position of each smart agent using equation (3). For example, FIG. 10 shows an asset (e.g., a military vehicle) to which a smart agent 115 is attached. (The smart agent 115 is enlarged in FIG. 10 for ease of viewing). The smart agent 115 includes a housing 130, a receiver 131 within the housing, and a processor 132 within the housing. Smart agents including an onboard DSP for location processing can be configured for a variety of applications. For example, in an assembly line, smart agents with on-board DSP's may be attached to a tractor during assembly, and/or to individual components on the assembly line.

in the example shown in FIG. 5, four beacons 101-104 periodically transmit four independent colliding RF signals 151-154, respectively. Each beacon 101-104 may transit a signal at one or more (e.g., four) frequencies. The smart agent receiver 109, within the region bounded by the beacons 101-104, scans all available beacons, and all of the corresponding RF channels, then detects and reads all readable signals on each frequency channel and process the read data, containing among other parameters, the Beacon ID for each read signal. All successfully read Beacon IDs (unique for each colliding signal source) is then transmitted back to the base station along with the agent movement status and conveyed to the server 108 for accumulation and processing. As long as the smart agent 109 is stationary, every next successful Beacon ID read increments its corresponding dedicated counter. The server 108 (which may be a central server 102 at a central location 800 that services one or more base stations 106a, 106b, or may be co-located with the base station) then calculates the final position using equation (2) and all counters for all Beacon IDs collected so far (while the agent is stationary).

Figure 6:
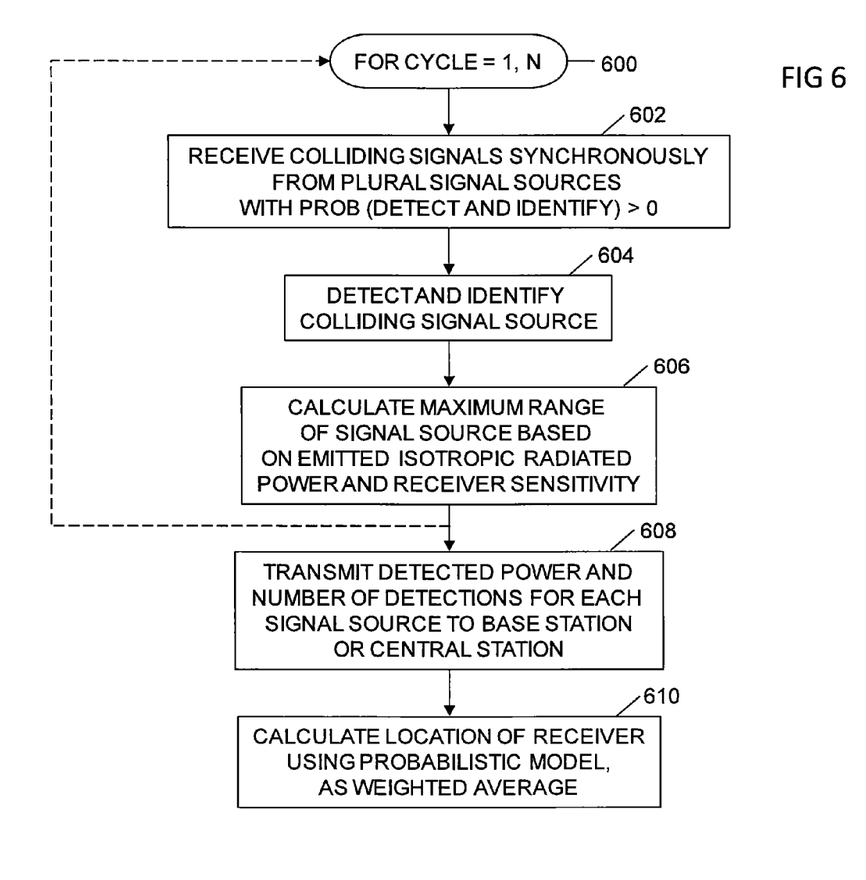
FIG. 6 is a flow chart of one embodiment of a location method for a colliding signals environment.

FIG. 6 is a flow chart of an exemplary method for determining location using colliding signals.

At step 600, the loop including steps 602 to 606 is executed either for a predetermined number of cycles, or for as long as the asset to which the receiver 115 is attached will be tracked.

At step 602, the receiver of smart agent 115 receives colliding signals from a plurality of signal sources 110-115, such that the receiver has a respective non-zero probability of detecting and identifying the colliding signals from each respective one of the signal sources at a given time. The colliding signals are configured with at least one common transmission parameter value so as to interfere with each other.

At step 604, the receiver 115 detects and identifies only one of the received colliding signals at any given time, the receiving and identifying being performed during each of a plurality of cycles.

At step 606, the receiver calculates the maximum range of each signal source based on a transmitted EIRP and a receiver sensitivity level of that signal source.

At step 608, the receiver transmits data to a base station or central station. These data include the detected power of each detected and identified signal and a respective number of times the receiver detects and identifies the respective colliding signals of each respective signal source. In some embodiments, the processor that calculates the location is located at the base station or central station.

At step 610, the appropriate processor uses a probabilistic model to calculate the location of the receiver. The model correlates a respective number of times the receiver detects and identifies one of the colliding signals and the probability of that signal being identified by the receiver, given the location of the receiver. In some embodiments, the processor that performs this calculation is located within the housing of the smart agent. In other embodiments, the processor that performs this calculation is located at the base station or central station.

In some cases, the asset to which a smart tag is attached will move during the period that the location is being monitored. Location accuracy may be improved by using any type of smoothing algorithms. For inst., during collection of successive readings, different weights are assigned to different measurements. In the case where the agent movement status indicates that the asset is moving, the weights assigned to older collected readings are reduced relative to the weights assigned to more recently collected readings. Thus, the estimate of the current location is most heavily weighted towards readings collected in a time period during which the asset does not move substantially. In some embodiments, the agent movement status is provided by one or more accelerometers in the smart agent or coupled to the corresponding asset.

Figure 7:
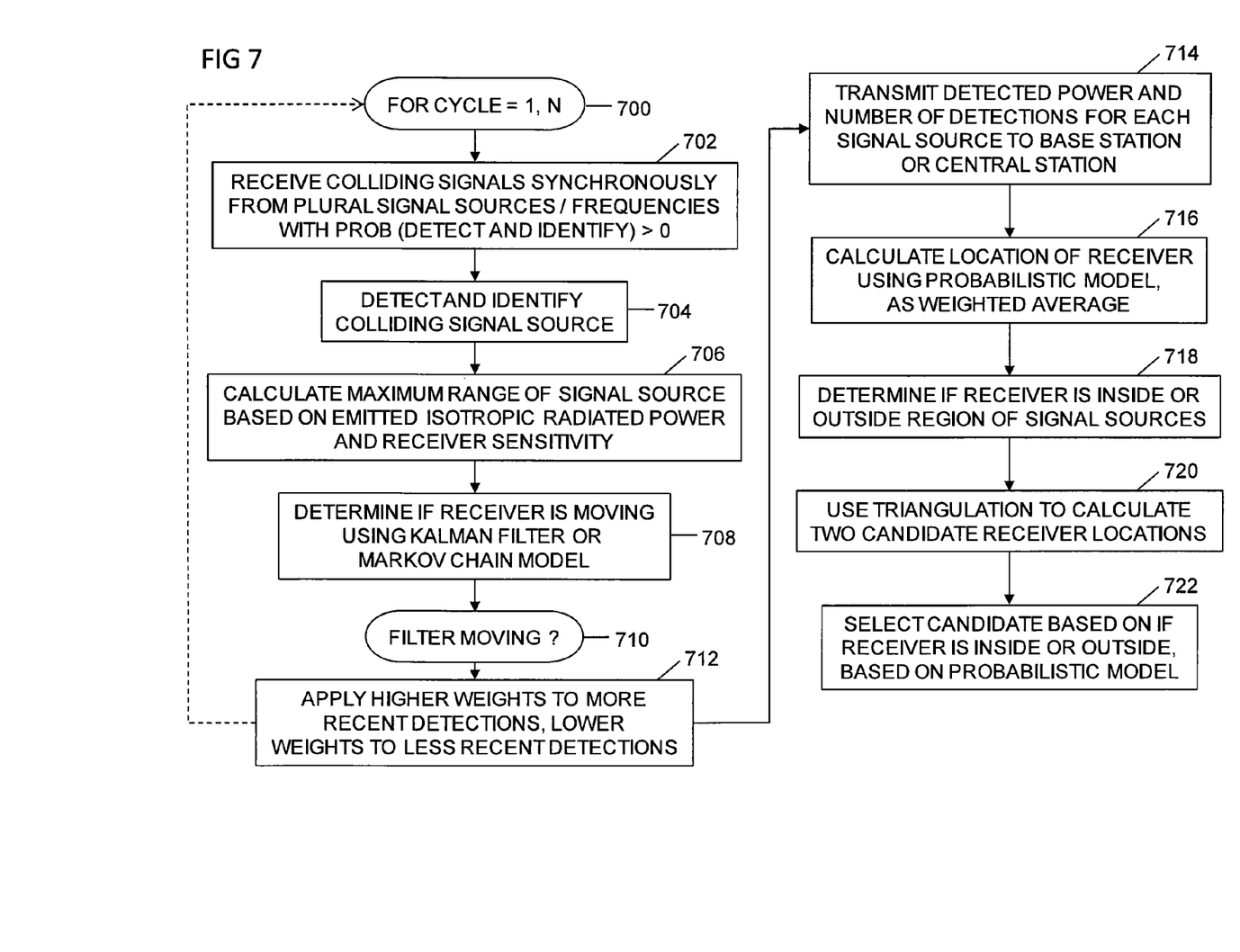
FIG. 7 is a detailed flow chart of one embodiment of a location method.

FIG. 7 is a flow chart of an example of one such embodiment.

At step 700, the loop including steps 702 to 712 is executed either for a predetermined number of cycles, or for as long as the asset to which the receiver 115 is attached will be tracked.

At step 702, the receiver of smart agent 115 receives colliding signals from a plurality of signal sources 110-115 synchronously, such that the receiver has a respective non-zero probability of detecting and identifying the colliding signals from each respective one of the signal sources at a given time. The colliding signals are configured with at least one common transmission parameter value so as to interfere with each other.

At step 704, the receiver 115 detects and identifies only one of the received colliding signals at any given time, the receiving and identifying being performed during each of a plurality of cycles.

At step 706, the receiver calculates the maximum range of each signal source based on a transmitted EIRP and a receiver sensitivity level of that signal source.

At step 708, a determination is made whether the receiver is moving based on the colliding signals using one of the group consisting of a Kalman filter and a Markov chain model. A smoothing algorithm is applied for improving the location accuracy.

At steps 710 and 712, relatively higher weights are applied to more recent signal detections and identifications, and relatively lower weights are applied to less recent signal detections and identifications, if the receiver is determined to be moving, based on the signals.

At step 714, the receiver transmits data to a base station or central station. These data include the detected power of each detected and identified signal and a respective number of times the receiver detects and identifies the respective colliding signals of each respective signal source. In some embodiments, the processor that calculates the location is located at the base station or central station.

At step 716, the appropriate processor uses a probabilistic model to calculate the location of the receiver. The model correlates a respective number of times the receiver detects and identifies one of the colliding signals and the probability of that signal being identified by the receiver, given the location of the receiver. In some embodiments, the processor that performs this calculation is located within the housing of the smart agent. In other embodiments, the processor that performs this calculation is located at the base station or central station.

At step 718, a determination is made whether the location calculated using the probabilistic (colliding signals) model is inside or outside of a region bounded by the plurality of signal sources.

At step 720, the triangulation module uses triangulation to independently compute the location of the receiver based on signals reflected from the receiver. In the event that the triangulation module receives an original signal from inside the region bounded by the beacons and a reflection of the same signal from outside of that region, the triangulation provides a first candidate location inside the region and a second candidate location outside of the region At step 722, either the first candidate location or the second candidate location is selected based on the determination of step 718. Alternatively, whichever of the first or second candidate locations is closer to the weighted average location calculated by the probabilistic model (using a Euclidean distance calculation) is selected.

Although the example above describes an RF location system, in other embodiments, the probabilistic model is applied to determine the location of a receiver in the presence of colliding signals, where the colliding signals are configured with at least one common transmission parameter value so as to interfere with each other, so that the receiver only detects and identifies one of the received colliding signals at any given time. The received signal authenticity of each signal includes random deviations, so that over a large number of transmissions each received signal authenticity varies with a mean and a variance, according to a probability density function. Each received signal has a respective non-zero probability of being detected and identified during any given transmission cycle.

In the examples above, it is assumed that the received signal parameters by a stationary receiver from a given signal source has random variations, e.g., according to a Gaussian distribution. Give this assumption, the "center of mass" calculation described above provides an appropriate calculation for the weighted average location of the receiver. The method described herein may also be used for location determination in the presence of colliding signals for which the received signal authenticity from a given signal source has random variations according to a different probability distribution function. In that case, the center of mass calculation may also vary, depending on the distribution of the signal variations.

Examples are provided above in which the receiver is a smart agent (or tag) configured to be attached to an asset to be tracked (e.g., military assets, parts to be stored in a warehouse, parcels to be delivered by a courier, etc.). In other embodiments, the receiver may be included in a computing device, such as a smart phone or laptop computer.

If the asset is constrained to move along a line segment, it is possible to determine the position of the asset using the method and system described herein with only two beacons. With three or more beacons, the location of the asset can be determined within a two or three dimensional region. In any given system, the stability of the location data increases when a larger number of measurements are collected. Generally, increasing the number of beacons and/or the number of frequencies for which each beacon broadcasts signals will increase the accuracy of the location determination. The number of measurements that are used to achieve a desired level of accuracy for any given system depends on the application, the level of accuracy desired, the number of beacons, and the number of frequencies for which signals are broadcast from each beacon. In some systems, three to five readings (for each frequency) is sufficient. If a large number of readings are collected, the distribution of the location data approaches a Gaussian distribution.

The present invention may be embodied in systems including computer-implemented processes and apparatus for practicing those processes. Some embodiments include one or more elements comprising computer program code embodied in tangible machine readable storage media, such as random access memory (RAM), floppy diskettes, read only memories (ROMs), CD-ROMs, hard disk drives, flash memories, or any other machine-readable storage medium, wherein, when the computer program code is loaded into and executed by a computer, the computer becomes an apparatus for implementing one or more elements of an embodiment of the invention. Some embodiments include one or more elements embodied in the form of computer program code, whether stored in a storage medium, loaded into and/or executed by a computer, such that, when the computer program code is loaded into and executed by a computer, the computer becomes an element of an apparatus according to an embodiment of the invention. When implemented on a general-purpose processor, the computer program code segments configure the processor to create specific logic circuits. In some embodiments, one or more elements may alternatively be embodied in a digital signal processor formed of application specific integrated circuits for performing one or more steps of a method according to an embodiment of the invention.

Although the subject matter has been described in terms of exemplary embodiments, it is not limited thereto. Rather, the appended claims should be construed broadly, to include other variants and embodiments, which may be made by those skilled in the art.

What is claimed is:

1. A method comprising:
   (a) receiving colliding signals by a receiver from a plurality of signal sources, such that the receiver has a respective non-zero probability of detecting and identifying the colliding signals from each respective one of the signal sources at a given time, the colliding signals configured with at least one common transmission parameter value so as to interfere with each other, so that the receiver only detects and identifies one of the received colliding signals at any given time, the receiving and identifying being performed during each of a plurality of cycles; and
   (b) calculating the location of the receiver, based on a respective number of times the receiver detects and identifies a respective one of the colliding signals from each respective one of the signal sources, among a total number instances of colliding signals from the plurality of signal sources.

2. The method of claim 1, wherein the colliding signals are received synchronously.

3. The method of claim 1, wherein the at least one transmission parameter of the colliding signals from each of the signal sources varies with a predetermined probability distribution.

4. The method of claim 3, wherein the colliding signals from the at least two signal sources are the same as each other with respect to at least one of the group consisting of carrier frequency, occupied frequency band, modulation type, compression method and compression code, and the receiver has a 100% probability of detecting each individual one of the signals if transmitted alone within a range of the receiver and a non-zero probability of detecting each individual one of the signals when two or more of the signals are transmitted simultaneously within the range of the receiver.

5. The method of claim 3, wherein the colliding signals from the at least two signal sources have the same carrier frequency, channel bandwidth, modulation method, compression method and compression code as each other.

6. The method of claim 1, wherein the calculating step calculates the location as a weighted average of locations of the plurality of signal sources.

7. The method of claim 6, wherein the location of the plurality of signal sources in a three dimensional X, Y, Z space is calculated according to the equations:

$$X = \frac{\sum_{i=0}^{n}\left[\frac{Q_i^2 x_i}{r_i}\right]}{\sum_{i=0}^{n}\left[\frac{Q_i^2}{r_i}\right]},$$

$$Y = \frac{\sum_{i=0}^{n}\left[\frac{Q_i^2 y_i}{r_i}\right]}{\sum_{i=0}^{n}\left[\frac{Q_i^2}{r_i}\right]},$$

$$Z = \frac{\sum_{i=0}^{n}\left[\frac{Q_i^2 z_i}{r_i}\right]}{\sum_{i=0}^{n}\left[\frac{Q_i^2}{r_i}\right]}$$

Where:

$x_n$, $y_n$, $z_n$ are location coordinates of the $n^{th}$ source, $Q_n$ is a total number of successful reads of one of the colliding signals, and $r_n$ is a maximum range of coverage of one of the signal sources.

8. The method of claim 7, wherein the maximum range of each signal source is calculated based on a transmitted Emitted Isotropic Radiated Power and a receiver sensitivity level of that signal source.

9. The method of claim 6, further comprising:
determining whether the receiver is moving; and
applying first weights to more recent signal detections and identifications, and second weights to less recent signal detections and identifications, if the receiver is determined to be moving, based on the signals, wherein the first weights are higher than the second weights.

10. The method of claim 9, wherein the step of determining whether the receiver is moving is performed using a smoothing algorithm.

11. The method of claim 1, further comprising transmitting detected power of each detected and identified signal and a respective number of times the receiver detects and identifies the respective colliding signals of each respective signal source to a base station or central station, wherein the processor is located at the base station or central station.

12. The method of claim 1, wherein the receiving step includes receiving first colliding signals from a first subset of the signal sources at a first carrier frequency, and receiving second colliding signals from a second subset of the signal sources at a second carrier frequency.

13. The method of claim 1, further comprising:
(c) determining whether the calculated location is inside or outside of a region bounded by the plurality of signal sources;
(d) using triangulation to independently compute the location of the receiver based on signals reflected from the receiver, wherein the triangulation provides a first candidate location inside the region and a second candidate location outside of the region; and
(e) selecting either the first candidate location or the second candidate location based on the determination of step (c).

14. Apparatus comprising:
a receiver for receiving colliding signals from a plurality of signal sources, such that the receiver has a respective non-zero probability of detecting and identifying the colliding signals from each respective one of the signal sources at a given time, the colliding signals configured to interfere with each other, so that the receiver only detects and identifies one of the received colliding signals at any given time, the receiving and identifying being performed during each of a plurality of cycles; and
a processor configured to calculate the location of the receiver, based on a respective number of times the receiver detects and identifies a respective one of the colliding signals from each respective one of the signal sources, among a total number instances of colliding signals from the plurality of signal sources.

15. The apparatus of claim 14, wherein the processor is configured to calculate the location as a weighted average of locations of the plurality of signal sources.

16. The apparatus of claim 14, further comprising:
means for determining whether the calculated location is inside or outside of a region bounded by the plurality of signal sources;
a triangulation module to independently compute the location of the receiver based on signals reflected from the receiver, wherein the triangulation provides a first candidate location inside the region and a second candidate location outside of the region; and
means for selecting the first candidate location or the second candidate location based on the determination by the determining means.

17. The apparatus of claim 14, wherein the receiver and the processor are included in a housing configured to be attached to an asset for tracking a location of the asset.

18. The apparatus of claim 14, further comprising:
a plurality of beacons, each beacon including at least one of the plurality of signal sources for transmitting the signals.

19. The apparatus of claim 18, further comprising a clock for transmitting a clock signal to the receivers and the beacons, wherein the beacons and receivers use the clock signal for synchronous transmission and receipt, respectively, of the signals.

20. The apparatus of claim 19, wherein the beacons are located within the same geographic region as each other,
the apparatus further comprising a base station coupled to the plurality of beacons and the receiver, for synchronizing the beacons and receiver, and for receiving the detected power of each detected signal and the respective number of times the receiver detects the respective signals of each respective signal source from the receiver, the base station containing the processor.

21. The apparatus of claim 14, further comprising
first and second pluralities of beacons, each beacon including at least one of the plurality of signal sources for transmitting the signals, the first plurality of beacons located in a first geographic region, the second plurality of beacons located in a second geographic region;

a first base station coupled to the first plurality of beacons and the receiver, for synchronizing the beacons and the receiver, and for receiving the detected power of each detected signal and the respective number of times the receiver detects the respective signals of each respective signal source from the receiver, a second base station coupled to the second plurality of beacons and a second receiver, for synchronizing the second plurality of beacons and the second receiver, and for receiving detected power and respective number of times from the second receiver for each respective signal source detected by the second receiver, a central station coupled to the first base station and a second base station, the central station containing the processor for calculating the location of the receiver, the central station having a storage device for storing receiver location data.

22. A non-transitory machine readable storage medium encoded with computer program code, such that when the computer program code is executed by a processor associated with a receiver, the processor performs a method comprising:
(a) receiving colliding signals by the receiver from a plurality of signal sources, such that the receiver has a respective non-zero probability of detecting and identifying the colliding signals from each respective one of the signal sources at a given time, the colliding signals configured to interfere with each other, so that the receiver only detects and identifies one of the received colliding signals at any given time, the receiving and identifying being performed during each of a plurality of cycles; and
(b) calculating the location of the receiver, based on a respective number of times the receiver detects and identifies one of the colliding signals from each respective one of the signal sources, among a total number instances of colliding signals from the plurality of signal sources.

23. The machine readable storage medium of claim 22, wherein:
the colliding signals from at least two of the signal sources have respectively different compression codes, and
the colliding signals from the at least two signal sources have the same carrier frequency, occupied frequency band, modulation type, compression method and compression code as each other, and the receiver has a 100% probability of detecting each individual one of the signals if transmitted alone within a range of the receiver and a non-zero probability of detecting each individual one of the signals when two or more of the signals are transmitted simultaneously within the range of the receiver.

24. The machine readable storage medium of claim 22, wherein the location of the plurality of signal sources in a three dimensional X, Y, Z space is calculated according to the equations:

$$X = \frac{\sum_{i=0}^{n} \left[\frac{Q_i^2 x_i}{r_i}\right]}{\sum_{i=0}^{n} \left[\frac{Q_i^2}{r_i}\right]},$$

$$Y = \frac{\sum_{i=0}^{n} \left[\frac{Q_i^2 y_i}{r_i}\right]}{\sum_{i=0}^{n} \left[\frac{Q_i^2}{r_i}\right]},$$

$$Z = \frac{\sum_{i=0}^{n} \left[\frac{Q_i^2 z_i}{r_i}\right]}{\sum_{i=0}^{n} \left[\frac{Q_i^2}{r_i}\right]}$$

Where:
$x_n, y_n, z_n$ are location coordinates of the $n^{th}$ source,
$Q_n$ is a total number of successful reads of one of the colliding signals
$r_n$ is a maximum range of coverage of one of the signal sources.

25. The machine readable storage medium of claim 22, wherein the calculating step calculates the location as a weighted average of locations of the plurality of signal sources, and the method further comprises:
determining whether the receiver is moving; and
applying first weights to more recent signal detections and identifications and second weights to less recent signal detections and identifications, if the receiver is determined to be moving, based on the colliding signals, wherein the first weights are higher than the second weights.

26. The method of claim 1, wherein the receiving step includes receiving first colliding signals from at least two of the signal sources at a first carrier frequency, and receiving second colliding signals from at least two of the signal sources at a second carrier frequency.

* * * * *